United States Patent [19]
Bühring et al.

[11] Patent Number: 6,141,195
[45] Date of Patent: Oct. 31, 2000

[54] DATA AND/OR ENERGY TRANSMISSION DEVICE WITH A DISCONNECTING UNIT

[75] Inventors: Peter Bühring, Hamburg; Egon Jöhnk, Norderstedt, both of Germany

[73] Assignee: U.S. Philips Corporation, New York, N.Y.

[21] Appl. No.: 09/222,401

[22] Filed: Dec. 29, 1998

[30] Foreign Application Priority Data

Jan. 2, 1998 [DE] Germany .......................... 198 00 049

[51] Int. Cl.$^7$ ..................................................... H02H 3/00
[52] U.S. Cl. .............................. 361/67; 361/59; 700/59; 340/660
[58] Field of Search .................................. 361/62–69, 71, 361/59, 67; 700/57–59; 340/635, 660–662, 650

[56] References Cited

U.S. PATENT DOCUMENTS

| | | | |
|---|---|---|---|
| 4,638,175 | 1/1987 | Bradford et al. | 307/64 |
| 4,752,698 | 6/1988 | Furuyama et al. | 307/116 |
| 4,831,484 | 5/1989 | Bruch | 361/101 |
| 5,170,310 | 12/1992 | Studtmann et al. | 361/94 |
| 5,654,859 | 8/1997 | Shi | 361/66 |

*Primary Examiner*—Josie Ballato
*Assistant Examiner*—Kim Huynh
*Attorney, Agent, or Firm*—Leroy Eason

[57] ABSTRACT

Short-circuits are liable to occur between the two conductors in a system in which data and/or energy is transmitted to a plurality of receivers/users via two conductors. Transmission is then interrupted and the supply source is inadmissibly over-loaded. The invention provides disconnecting units which recognize occurrence of short-circuits between the conductors and, in response thereto, isolate the part of the system in which the short-circuit has occurred from the supply of data and/or energy, so that the remainder of the system remains operational. After removal of the short-circuit, the isolated part is automatically re-connected to the system. The potential on the conductors ahead of and following a disconnecting unit is monitored via current limiting circuit elements which bridge a switch in the disconnecting unit. One or more monitoring units in a disconnecting unit sense the potential of the conductors and based thereon determine whether to render the switch in such disconnecting unit conductive or non-conductive.

8 Claims, 8 Drawing Sheets

DATA AND/OR ENERGY TRANSMISSION DEVICE WITH A DISCONNECTING UNIT

BACKGROUND OF THE INVENTION

1. Field of the Invention

The invention relates to a device for the transmission of data and/or energy via conductors, at least one conductor thereof being subdivided into a first and a second conductor segment by at least one disconnecting unit, each disconnecting unit including at least one monitoring unit.

2. Description of the Related Art

When short-circuits occur between the two conductors or in the connected stations in a system in which data and/or energy is transmitted to a plurality of stations via two conductors, neither data nor energy can be transmitted and the feeding source is loaded to an inadmissible extent.

EP 0 626 743 A2 discloses a system in which disconnecting switches are controlled by means of different short-circuit switches in a two-conductor ring system. When a short-circuit occurs, the relevant conductor is disconnected by disconnecting switches in monitoring units. The remainder of the system, situated beyond the short-circuit, is fed with a voltage via switches in the beginning and end monitoring units from the other side where the two conductors enter the beginning and end monitoring unit again. Because at least one user must be connected between two monitoring units, in the case of a short-circuit at least this user, and possibly also several other users arranged between the monitoring units, will be switched off. The conductors, however, are tested for short-circuits only during switching on. Moreover, this system is designed only for DC voltages.

WO-A-92/10018 describes the sampling of conductors by means of current and voltage sensors and a controller evaluates the values determined and interrupts the conductors by means of semiconductor switches when a threshold voltage is exceeded. If these conductors are not interrupted in the case of failure of the switches, the controller opens a main fuse. This system serves not only to relieve the driving source, but notably to avoid arcing in the case of mechanically switched fuses.

SUMMARY OF THE INVENTION

It is an object of the invention to detect short-circuits and overloads in a data and/or energy transmission device having disconnecting units, and to uncouple the relevant conductor segments in such a manner that the driving source is not overloaded and the remaining conductor segments remain operational and hence reliable data and energy transmission can be maintained in open networks.

This object is achieved according to the invention in that a monitoring unit is connected to at least one conductor segment and is arranged to actuate a switch when the voltage of at least one of the connected conductor segments drops below a first actuation threshold or exceeds a second actuation threshold, and that the switch is bridged by a current limiting element.

There are provided disconnecting units which each consist of at least a monitoring unit and a switch, the monitoring unit controlling the switches in the conductors in such a manner that the switch is opened in the case of short-circuit or overloading. The short-circuiting or overloading is detected by one or more series-connected monitoring units. The switch is connected in one of the conductors and is controlled by the monitoring unit in such a manner that it is conductive in the absence of a short-circuit. When the monitoring unit detects a short-circuit or overloading, the switch is opened. The switch is bridged by a current limiting element, so that the potential is high-ohmically transferred to the conductor segment following the disconnecting unit. The monitoring unit controls the switch in the disconnecting unit on the basis of said potential. When a short-circuit or an overload is removed, the switch is automatically closed by the monitoring unit. When the conductor system is constructed as a ring system, it can be supplied with a voltage from both sides. Because a monitoring unit always monitors the potential following a disconnecting unit, a plurality of series-connected monitoring units are used so as to check the potential at both sides of the switch. The disconnecting unit can thus operate in a bidirectional manner, i.e. the input and the output of the disconnecting unit can be interchanged. The system of conductors can operate with a DC voltage or an AC voltage. The actuation thresholds used by the monitoring units so as to check the potentials on the connected conductor segments can be controlled with hysteresis. The first actuation threshold value, necessary to open the switch, is then lower than the second actuation threshold which must be reached so as to close the switch of the disconnecting unit.

In the simplest case, such a two-conductor system operates with a DC voltage from one side only. The switch then consists of only one field effect power transistor which is controlled by the monitoring unit. The gate of the field effect power transistor is coupled to a control transistor of the monitoring unit. The control transistor is also preferably a field effect transistor. Because the two-conductor system operates with a DC voltage from one side only, the potential of the subdivided conductor segment is checked only following the switch. The gate of the control transistor in the monitoring unit is connected to this conductor segment. When the potential of this conductor segment exceeds the second actuation threshold, the control transistor of the monitoring unit is turned on and hence establishes the connection to the non-subdivided conductor. The potential of the non-subdivided conductor is thus transferred to the gate of the field effect power transistor in the switch which is thus turned on. When the potential on the monitored conductor segment drops below the first actuation threshold, the control transistor remains in the turned off state and so does the field effect power transistor in the switch. The generator is thus isolated from the short-circuit by the open switch.

When the conductor system is supplied with a voltage from both sides, two monitoring units are employed, because the input and the output of the isolating switch can now be interchanged. The switch then consists of two field effect power transistors of the same conductivity type whose sources are interconnected. Their gates are also interconnected and coupled to a control transistor of a monitoring unit. The monitoring units check the connected conductor segments of the conductor subdivided by the switch. To this end, the control transistors are driven with the respective potential of a connected conductor segment. The control transistors of the monitoring units are connected in series. These two control transistors establish the connection to the second conductor which, during normal operation, has a potential other than that of the conductor in which the switch with the power transistors is inserted. When the control transistor is turned on, the gates of the power transistors are driven, via a voltage divider, with a potential which turns on the power transistors in the switch. The conductivity type of the control transistors of the monitoring units opposes that of the power transistors in the switch. When the potential on the connected conductor segments of the subdivided conductor exceed the second actuation threshold, being higher than the threshold voltage of the control transistors of the monitoring units, the latter transistors are turned on and connect the non-interrupted conductor to the gates of the power transistors in the switch. When a connection has been established via the series-connected control transistors, the power transistors in the switch are turned on and hence close the switch. In the case of short-circuit or overloading, the potential on at least one connected conductor segment drops below the first actuation threshold, so that the control transistors of the monitoring unit, and hence also the power transistors of the switch to be controlled, are turned off and hence the conductor is interrupted and the short-circuited conductor segment is effectively isolated from the remaining, functioning part of the conductor system.

The current limiting element bridging the switch is a high-ohmic resistor or a controllable resistor combination, and is called a test resistor hereinafter. The potential is applied to the output of the disconnecting unit in a high-ohmic manner via this test resistor. In the absence of a short-circuit while the switch is open, a potential exceeding the second actuation threshold can be built up and the switch is closed. When the switch is closed and a short-circuit occurs, the potential drops below the required value and the switch is opened. When the short-circuit is removed, the switch then being open, a potential required for the closing of the switch arises across the test resistor and the switch is automatically closed.

When suitably extended, the disconnecting unit is suitable not only for DC operation but also for AC operation. For operation with an AC voltage, the switch is extended by means of storage elements. The storage elements are preferably capacitances which are charged, for example during the positive half-wave and store the energy required to keep the switch closed also during the negative half-wave. This capacitance is inserted between the junction of the two sources of the power transistors of the switch and the junction of the interconnected gates of the power transistors. If short-circuits occur only during the half-wave during which the switch is closed by the stored charge of the capacitor, they will not be detected. Therefore, further extensions are made so as to ensure that the disconnecting unit detects short-circuits also during the second half-wave. These extensions consist of a plurality of field effect transistors and resistors, a diode and a storage element. This storage element is not charged in the case of a short-circuit during the second half-wave of the AC voltage, so that the control transistor of the monitoring unit is not turned on in any half-wave and hence the capacitance in the switch is not charged either.

The conductivity of the power transistors in the switch defines the half-wave in which short-circuits are detected.

While the switch is closed the monitoring unit can also check the state of the energy or data transmission at the output of the disconnecting unit at any instant and immediately open the switch and adjust a high-ohmic test state immediately whenever a short-circuit occurs. The monitoring units thus detect any short-circuit at any instant and control the switch accordingly. When a short-circuit is removed, the potential on the conductor segments connected to the monitoring units increases via the test resistor, so that the switch of the disconnecting unit is closed again without it being necessary to switch on or reset the system again.

In systems which have a low-ohmic load during the positive half-wave and a high-ohmic load during the negative half-wave, for example as disclosed in German patent application 197 04 884.6, the test resistor is advantageously controlled in steps. To this end, the current limiting element consists of a plurality of series-connected ohmic resistors, individual resistors being bridged by means of switching transistors. High-ohmic and low-ohmic test resistors can thus be realized. First of all, the potential is transferred from the input of the disconnecting unit to the output of the disconnecting unit via a high-ohmic test resistor. When the monitoring unit detects a short-circuit, the switch in the disconnecting unit then remains open, i.e. the transistors in the switch are not turned on. The test resistor is switched to a low-ohmic value only when a potential higher than the second actuation threshold is detected and the switch is closed.

The use of hysteresis for the actuation threshold of the control transistor of the monitoring unit enhances the reliability of detection of short-circuits. During normal operation with a closed switch the actuation threshold is higher in order to detect a potential decrease quickly in the case of a short-circuit and to open the switch quickly. In the case of open switches the actuation threshold is lower so as to achieve perfect testing for short-circuits via the high-ohmic test resistor.

The following types of short-circuits are detected:
direct (low-ohmic) short-circuits between the conductors,
short-circuits via a resistor between the conductors, the resistance of the resistor being dependent on the proportioning of the system,
short-circuits via diodes whose anode is connected to the conductor carrying the higher potential and whose cathode is connected to the conductor carrying the lower potential.

Such a protection system ensures that in the case of a short-circuit, for example in the feed line to a user, the communication between other users is not obstructed.

BRIEF DESCRIPTION OF THE DRAWINGS

Some embodiments of the invention will be described in detail hereinafter with reference to the drawings. Therein.

DESCRIPTION OF THE PREFERRED EMBODIMENTS

Figure 1:
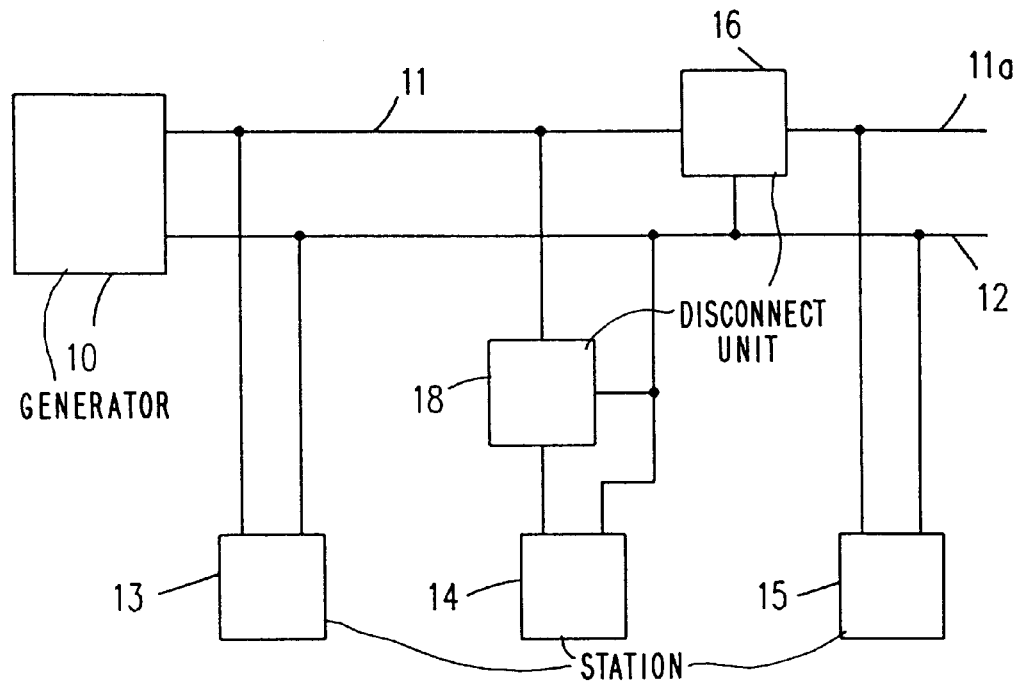
FIG. 1 is a block diagram showing the use of disconnecting units.

FIG. 1 shows a device for the transmission of energy and/or data. The generator 10 generates a voltage which is applied to two conductors 11, 12 and serves to supply the connected stations 13, 14, 15 . . . with energy and/or data. Disconnecting units are provided in the conductors 11 and 12 in order to disconnect complete sections of the system (disconnecting unit 16) or in the supply lead to one user in order to disconnect only this user (disconnecting unit 18). The reference 11*a* denotes the conductor segment which is situated following the disconnecting unit, viewed from the generator, and is disconnected, together with all users connected to this conductor segment, from the remainder of the system in the case of a short-circuit or overload.

Figure 2:
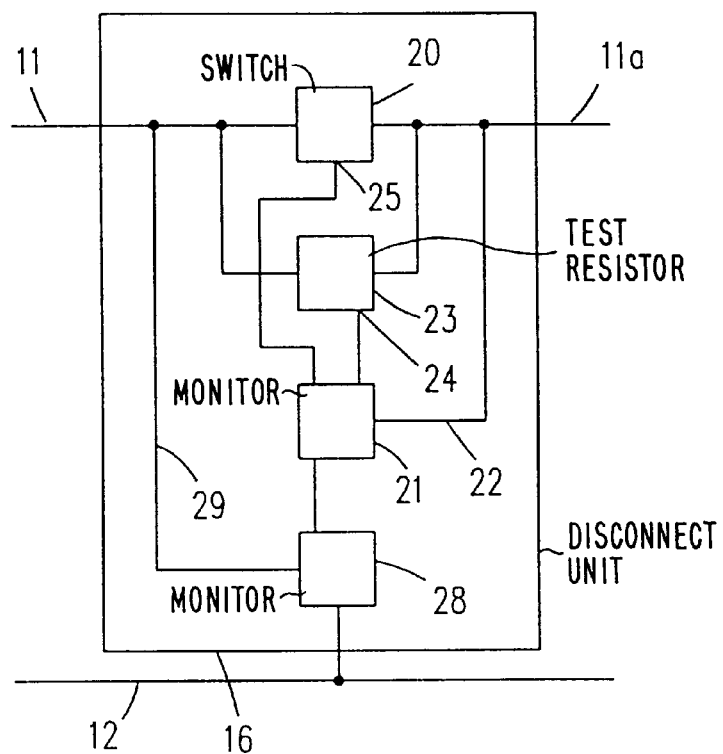
FIG. 2 is a block diagram with a disconnecting unit arranged in the conductor carrying the higher potential.

FIG. 2 shows a block diagram of the disconnecting unit 16 inserted in the conductor 11. The disconnecting unit 16 includes a switch 20, a test resistor 23 and the monitoring units 21 and 28; the monitoring unit 28 is connected in series with the monitoring unit 21 and establishes the connection between the control input 25 and the non-interrupted conductor 12. The potential of the conductor segment 11*a* of the switch 20 is checked at the output via the test conductor 22 of the monitoring unit 21 and the potential of the conductor segment 11 at the input of the switch 20 is checked via the test conductor 29 of the monitoring unit 28. The test resistor 23 is controlled by the monitoring units 21 and 28, via the control input 24. The disconnecting unit 16 is suitable for bidirectional operation, i.e. the generator voltage can be applied to the conductors 11 and 12 or to the conductors 11*a* and 12. Therefore, the disconnecting unit includes two monitoring units which check the potential on the conductor segments 11 and 11*a*.

Figure 3:
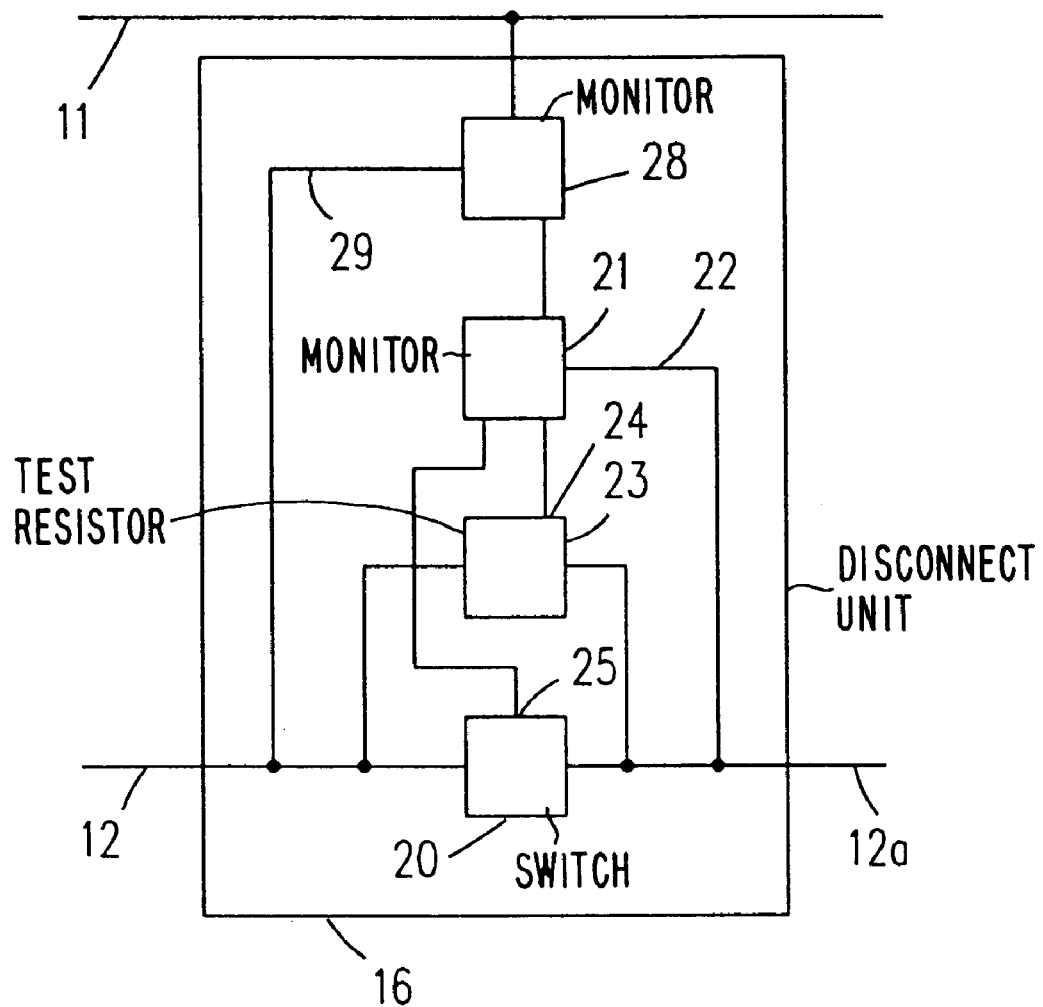
FIG. 3 is a block diagram with a disconnecting unit arranged in the conductor carrying the lower potential.

FIG. 3 shows an analogous arrangement for a disconnecting unit 16 in the conductor 12, comprising the same components as shown in FIG. 2. The conductor segment 12*a* is disconnected by the switch 20 in the case of short-circuit or overload. The conductor 11 is not interrupted in this embodiment.

Figure 4:
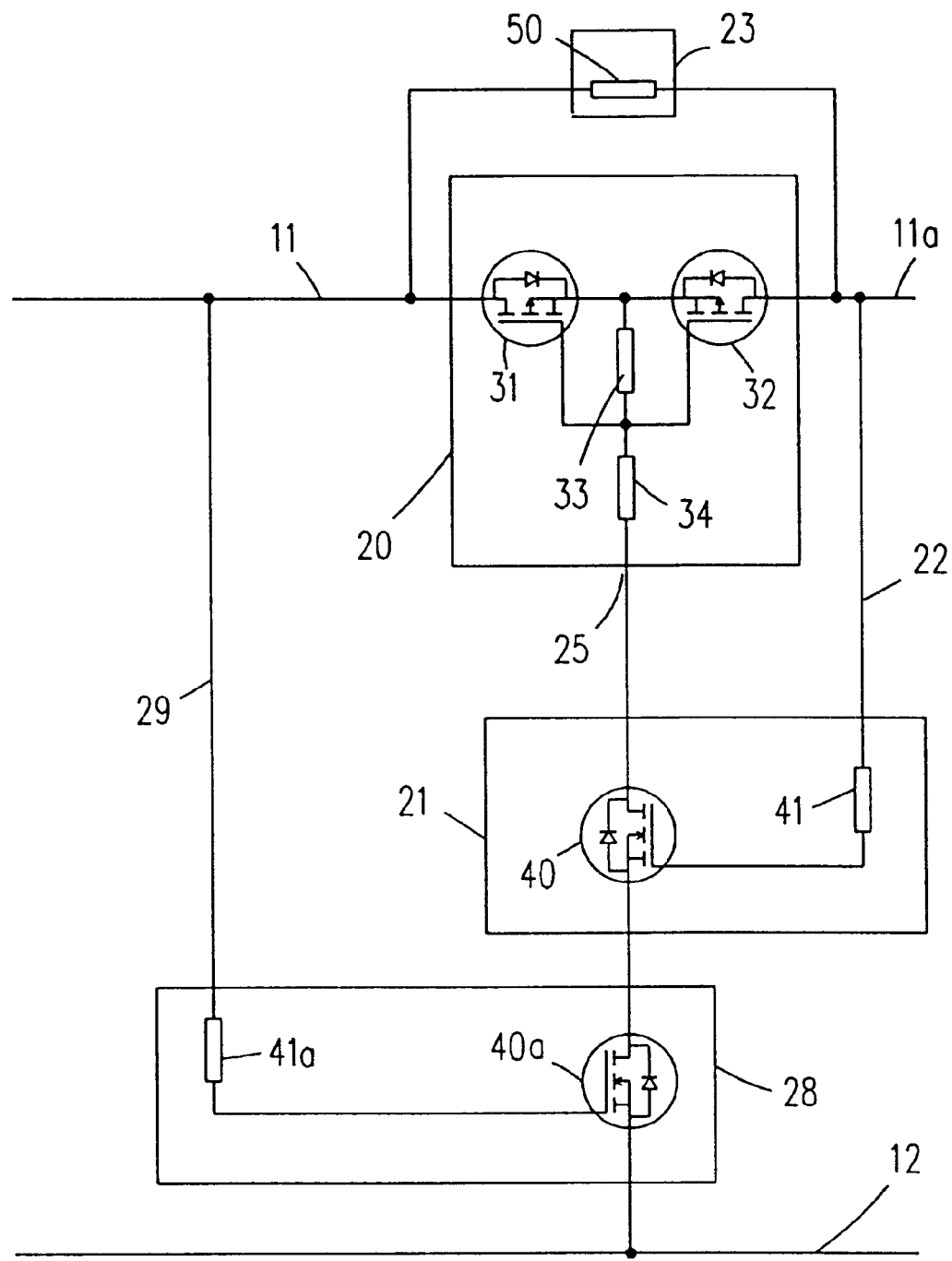
FIG. 4 is a circuit arrangement as shown in FIG. 2.

FIG. 4 shows a circuit arrangement for an implementation of a disconnecting unit as shown in FIG. 2 which is suitable for receiving a DC voltage from both sides, the potential on the conductor 11 being higher than that on the conductor 12. This arrangement includes the p-type power transistors 31, 32 and the resistors 33, 34, together forming the switch 20, and the n-type control transistors 40 and 40*a* with the resistors 41 and 41*a* which form part of the monitoring units 21 and 28. The test resistor 23, acting as a current limiting element which bridges the switch 20, is not controlled in the present embodiment and, therefore, comprises only the simple ohmic resistor 50. A test conductor 22 of the monitoring unit 21 for driving the control transistor 40 senses the potential of the conductor 11*a* at the output of the switch 20 and a further test conductor 29 of the monitoring unit 28 senses the potential of the conductor 11 at the input of the switch 20, being the output of the switch when voltage is applied to the conductors 11*a* and 12, in order to drive the control transistor 40*a* via the resistor 41*a*.

The switch 20 is inserted in the conductor 11 whose potential is higher than that of the conductor 12, i.e. in the supply of the positive potential in the case of a positive supply voltage and in the supply of the zero potential in the case of a negative supply voltage. The switch 20 consists of the two power transistors 31 and 32 and the voltage divider which is formed by the resistors 33 and 34 and is connected to the control input 25. The power transistors 31 and 32 are turned on only if the control input 25 carries a potential which is lower than that of the conductor 11. The monitoring unit 21 is connected in series with the monitoring unit 28. When the power switches 31 and 32 are open, the potential on the conductor 11 at the input of the switch 20 is applied, via the test resistor 23 at the output of the switch 20, to the conductor segment 11*a*. The potentials on the conductor segments 11 and 11*a* are sensed by means of the respective test conductors 22 and 29 and applied to a respective control input of the monitoring units 21 and 28 via the resistors 41 and 41*a*, i.e. to the gates of the control transistors 40 and 40*a*. When the potential on the test conductors 22 and 29 exceeds the actuation threshold, the relevant control transistor 40, 40*a* in the monitoring units 21 and 28 is closed. Provided that both monitoring units propagate the potential of the conductor 12 on the control input 25 of the switch, the voltage drop across the resistor 33 closes the power transistors 31 and 32. The non-disturbed normal operation of the disconnecting unit is thus established. When the disconnecting unit connected to the conductors 11 and 12 is connected to the generator 10 (FIG. 1), in the case of a short-circuit between the conductors 11 and 12 the potential on the test conductor 29 of the monitoring unit 28 will not reach the actuation threshold necessary to close the control transistor 40*a*. Consequently, the potential of the conductor 12 cannot be applied to the monitoring unit 21. The switching state of the monitoring unit 21 is thus irrelevant. The switch 20 is or remains open, because the power transistors 31 and 32 are not turned on. If a short-circuit or an overload occurs between the conductors 11*a* and 12 at the output of the disconnecting unit upon switching on, the potential at the test input 22 of the monitoring unit 21, applied to the conductor segment 11*a* via the test resistor 23, drops below the actuation threshold required to close the control transistor 40, and the control transistor 40 of the monitoring unit 21 is turned off. Consequently, the control input 25 cannot be connected to the monitoring unit 28 and the potential of the conductor 12, and the voltage required for closing the power switches 31 and 32 cannot be formed, so that the power transistors 31 and 32 are turned off and the switch 20 remains open. The feeding generator 10 (FIG. 1) and all users which are not connected to this conductor segment 11*a* are thus isolated from the short-circuit. A test state is established via the connection of the test resistor 23. When a short-circuit occurs during operation, the potential at the faulty side of the disconnecting unit drops below the actuation threshold and the relevant monitoring unit 21 or 28 detects the short-circuit between the conductors 11 and 12 in the described manner and the power transistors 31 and 32 in the switch 20 are turned off. When the short-circuit or the overload is removed, the potential can be built up again via the test resistor so as to exceed the trigger threshold so that the control transistors 40 and 40*a* propagate the potential of the conductor 12 again, the power transistors 31 and 32 are turned on and the switch 20 is closed, so that the normal operation has automatically been restored.

Figure 5:
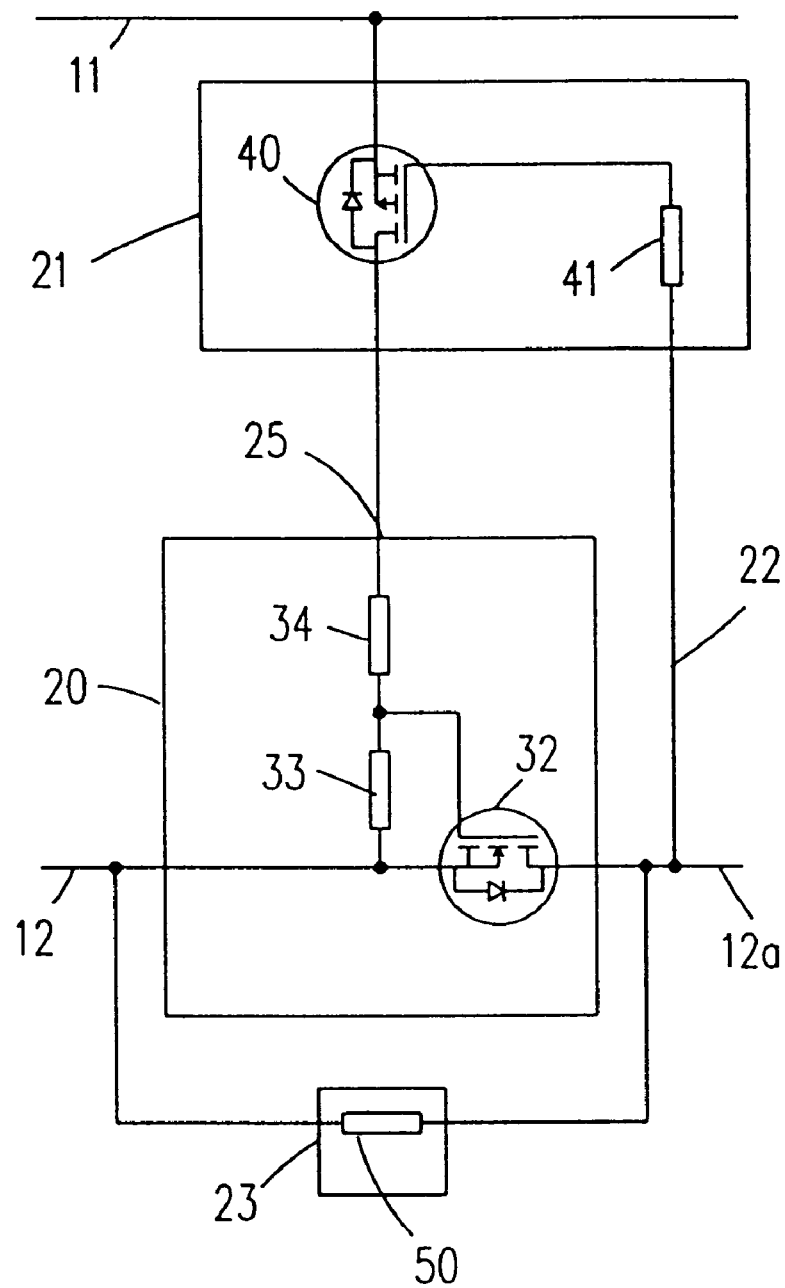
FIG. 5 is a circuit arrangement, with sensing by the monitoring unit only at the output side and with one power transistor in the switch.

FIG. 5 shows a circuit arrangement for DC voltage supply only to the conductors 11 and 12 in conformity with the arrangement of FIG. 3. The power transistor 32 in the switch 20 is of n-type conductivity and the control transistor 40 of the monitoring unit 21 is a p-type transistor. The present example shows only the sensing of the conductor 12*a* at the output of the switch 20, i.e. this disconnecting unit cannot be connected to the generator at both sides of the conductor. A monitoring unit for sensing the conductor 12 ahead of the switch 20 is also feasible, but is not shown. It would operate as in the example of FIG. 4. The disconnecting unit is arranged in the conductor 12 carrying the lower potential, i.e. in the supply for the zero potential in the case of a positive supply voltage and in the supply for the negative potential in the case of a negative supply voltage. In this embodiment the test resistor 23 again is not controllable and comprises only an ohmic resistor 50. The n-type power transistor 32 in the switch 20 is turned on only when a potential higher than the potential on the conductor 12 is applied to the control input 25. The monitoring unit 21 includes a p-type control transistor 40 whereby the potential of the conductor 11 is propagated to the control conductor 25. Propagation takes place in dependence on the potential on the conductor segment 12a which is sensed by means of the test conductor 22 at the output of the switch 20. When a system as shown in FIG. 1 and comprising disconnecting units as shown in FIG. 5 is switched on, the potential of the conductor 12 at the input of the switch 20 is applied, while the power transistor 32 is turned-off, to the output of the switch 20 via the test resistor 23. This potential is sensed by means of the test conductor 22 and applied to the control input of the control transistor 40 of the monitoring unit 21. When the potential exceeds an actuation threshold, the control transistor 40 is closed. The control input 25 of the switch 20 is then connected to the potential of the conductor 11, thus turning on the power switch 32 and establishing the normal operation of the disconnecting unit. When a short-circuit or an overload occurs between the conductors 11 and 12a at the output of the disconnecting unit, the potential at the conductor segment 12a does not reach the actuation threshold value required to close the control transistor 40 and the control transistor 40 remains turned off. Consequently, the control input 25 is no longer connected to the potential of the conductor 11 and the voltage required for closing the power transistor 32 cannot be formed. The DC source 10 (FIG. 1) is thus isolated from the short-circuit. The test state is established via the test resistor 23. When a short-circuit occurs during operation, the potential on the conductor segment 12a drops below the value of the actuation threshold, the control transistor 40 is turned off and the switch 20 interrupts the conductor 12. When the short-circuit between the conductors 11 and 12a is removed again, the potential on the conductor segment 12a at the output of the switch 20, and hence on the test conductor 22 of the monitoring unit 21, can again assume a value beyond the actuation threshold for closing the control transistor 40 of the monitoring unit 21 and automatically restore the normal operation.

For the bidirectional operation of the disconnecting unit, for which the input and the output of the switch 20 can be interchanged, use is made of monitoring units 21 and 28 (FIGS. 2 and 3). The two control transistors 40 and 40a (FIG. 4) of the monitoring units 21 and 28 then perform an AND-function. The power transistors 31 and 32 can be turned on only if the two control transistors 40 and 40a are also turned on, so that the switch 20 is closed.

The described embodiments for DC voltage supply offer perfect detection of all three described types of short-circuit; the value of the resistance which is still recognized as a short-circuit in the case of a short-circuit via a resistor is then dependent on the value of the test resistor 23 and the current flow during normal operation. The circuits shown in the FIGS. 4 and 5 can be extended for operation with an AC voltage.

In the case of an AC voltage, the conductor 11 carries the higher potential and the conductor 12 carries the lower potential only during the positive half-wave, so that the power transistors 31 and 32 of the switch of FIG. 4 would be turned on only during the positive half-wave. In order to establish a connection also for the negative half-wave, during which the potentials of the two conductors 11 and 12 are reversed, respective switches 20 as shown in FIG. 4 could be provided for the negative half-wave. A further possibility will be elucidated hereinafter. This solution involves a memory for bridging the negative half-wave.

Figure 6:
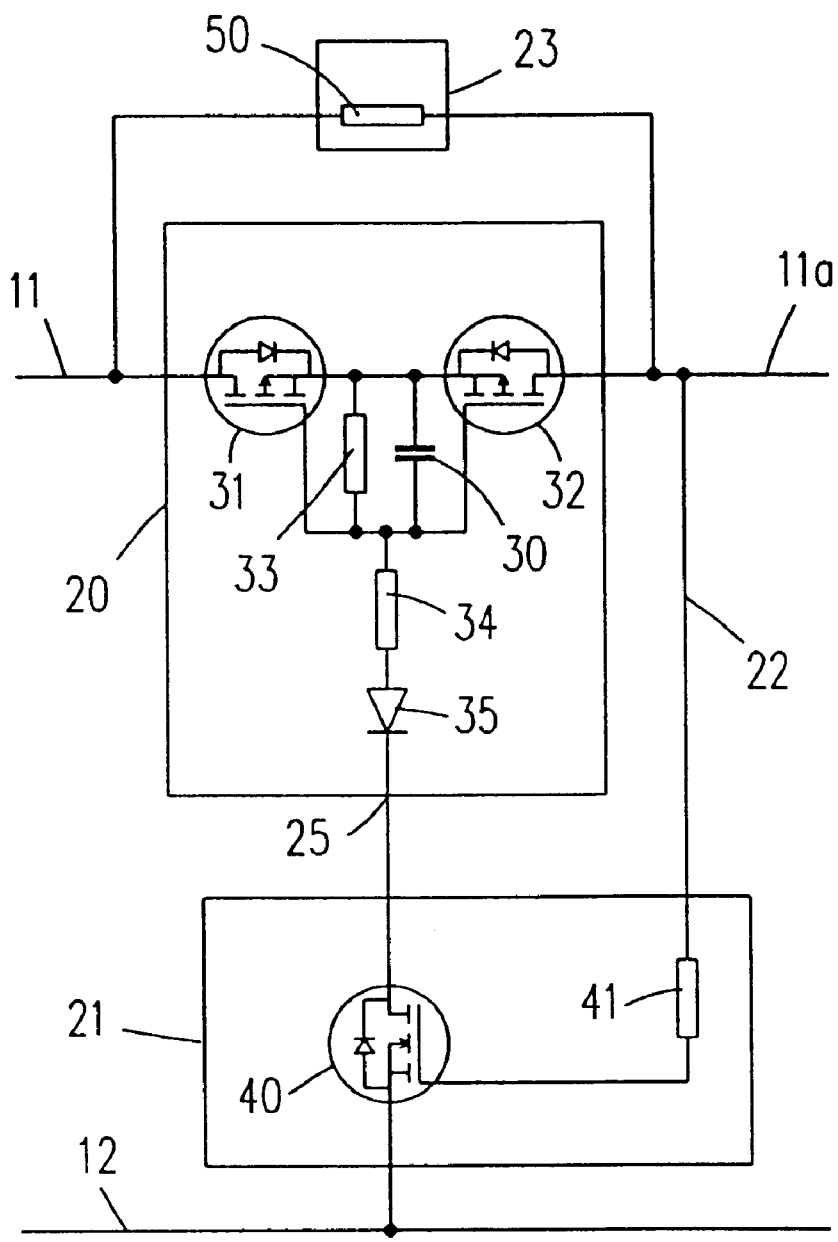
FIG. 6 is a circuit arrangement for AC voltage supply as shown in FIGS. 2 and 4, with sensing by the monitoring unit only at the output side.

FIG. 6 shows an embodiment for operation with an AC voltage, the operation during the positive half-wave of the AC voltage being the same as the operation for a DC voltage as described with reference to FIG. 2. This embodiment comprises the same components as the embodiment described with reference to the FIGS. 2 and 4, but in this case only the conductor 11a at the output of the switch 20 is sensed by means of only one monitoring unit 21. Additionally, a capacitance 30 is charged via the resistor 34 and the diode 35. The capacitance 30 is connected between the junction of the two sources of the power transistors 31 and 32 of the switch 20 and the junction of the interconnected gates of the power transistors 31 and 32. A discharge path in the form of a resistor 33 is connected parallel to the capacitance 30. During the negative half-wave of the AC voltage, during which the potential of the conductor 11 is lower than the potential of the conductor 12, the diode 35 prevents charge reversal of the capacitance 30, so that the voltage required for closing the power switches 31 and 32 is sustained. The discharging of the capacitance 30 via the resistor 33 should be adjusted in such a manner that the variation of the charging condition of the capacitance 30 during the negative half-wave is not too large. As has been described with reference to FIG. 2, a monitoring circuit 21 detects a short-circuit via the test conductor 22. In the case of a short-circuit, the control transistor 40 in the monitoring circuit 21 is turned off and, consequently, the capacitance 30 is not charged again during the positive half-wave. Because of the discharging via the resistor 33, the charging condition of the capacitance 30 changes until the deactivation threshold of the power transistors 31 and 32 in the switch is reached so that the switch is opened. The generator 10 (FIG. 1) is thus isolated from the short-circuit and the test state is established with the connection via the test resistor 23. When the short-circuit between the conductors 11a and 12 is removed again, the control transistor 40 is turned on and the capacitance 30 is charged again. The power transistors 31 and 32 are thus turned on also during the negative half-wave.

The circuit arrangement of FIG. 6 recognizes direct short-circuits, short-circuits via resistors and short-circuits with diodes which are active during the positive half-wave, but no short-circuits with diodes which are active during the negative half-wave, i.e. diodes whose anode is connected to the conductor 12 and whose cathode is connected to the conductor 11. An embodiment for this case will be described in detail hereinafter.

Figure 7:
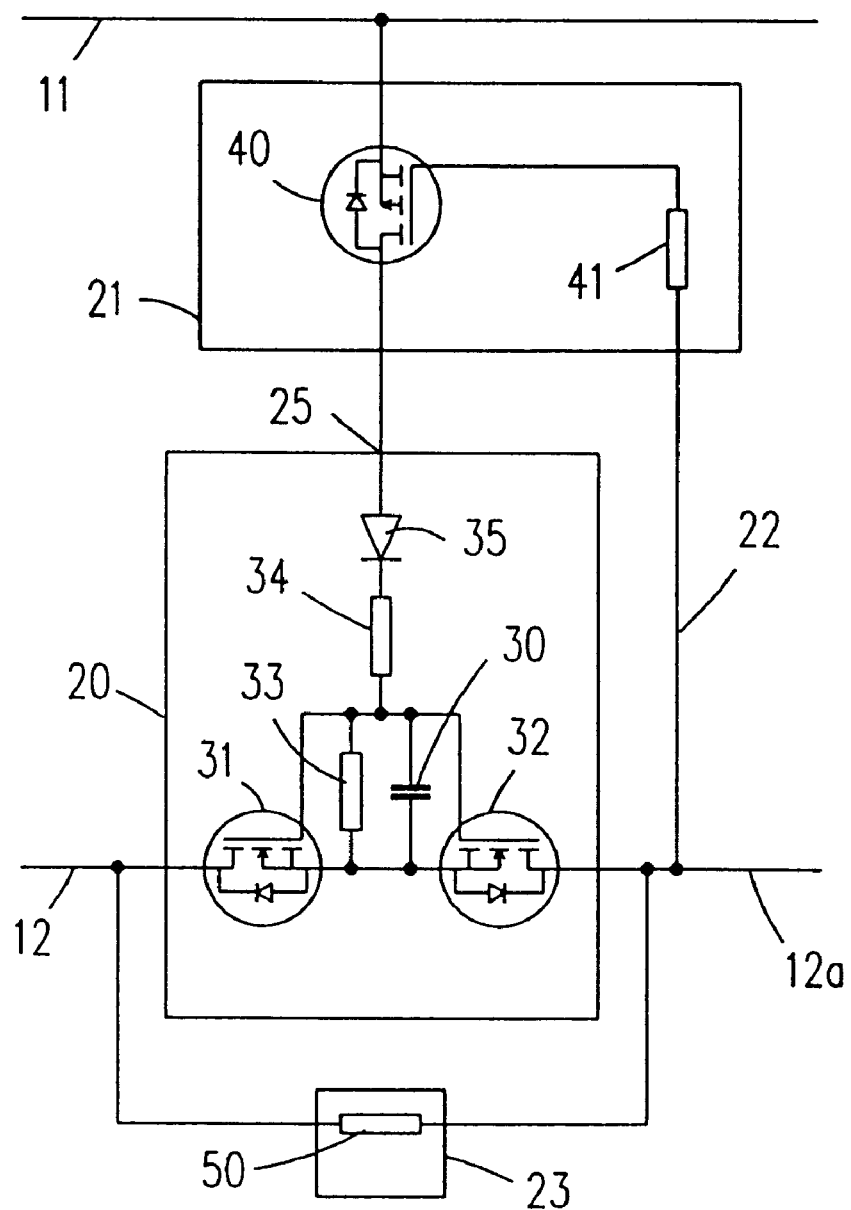
FIG. 7 is a circuit arrangement for AC voltage supply as shown in FIGS. 3 and 5 with sensing by the monitoring unit at the output side.

FIG. 7 shows an embodiment of a disconnecting unit which operates with an AC voltage, the switch 20 being inserted in the conductor 12 which carries the lower potential during the positive half-wave. The operation during the positive half-wave of the AC voltage is the same as that for the DC voltage (FIGS. 3 and 5). The bridging of the switching state of the power switches 31 and 32 during the negative half-wave as described with reference to FIG. 6 again holds.

The device of FIG. 7 again does not recognize short-circuits with diodes which are active during the negative half-wave of the AC voltage.

The disconnecting units described with reference to FIGS. 6 and 7 can also be used for the detection of short-circuits during the negative half-wave of the AC voltage. To this end, the disconnecting unit of FIG. 6 should be inserted in the conductor 12, because the latter conductor carries the higher potential during the negative half-wave; the disconnecting unit of FIG. 7 must then be inserted in the conductor 11 because the latter conductor carries the lower potential during the negative half-wave. Short-circuits with a diode during the positive half-wave are not recognized by these embodiments.

Each of the embodiments of the FIGS. 6 and 7 involves sensing only at the output of the switch 20. The circuits, however, can be extended with a monitoring unit 28 for sensing also the input of the switch 20 of FIG. 4. The monitoring units should then be connected in series.

Figure 8:
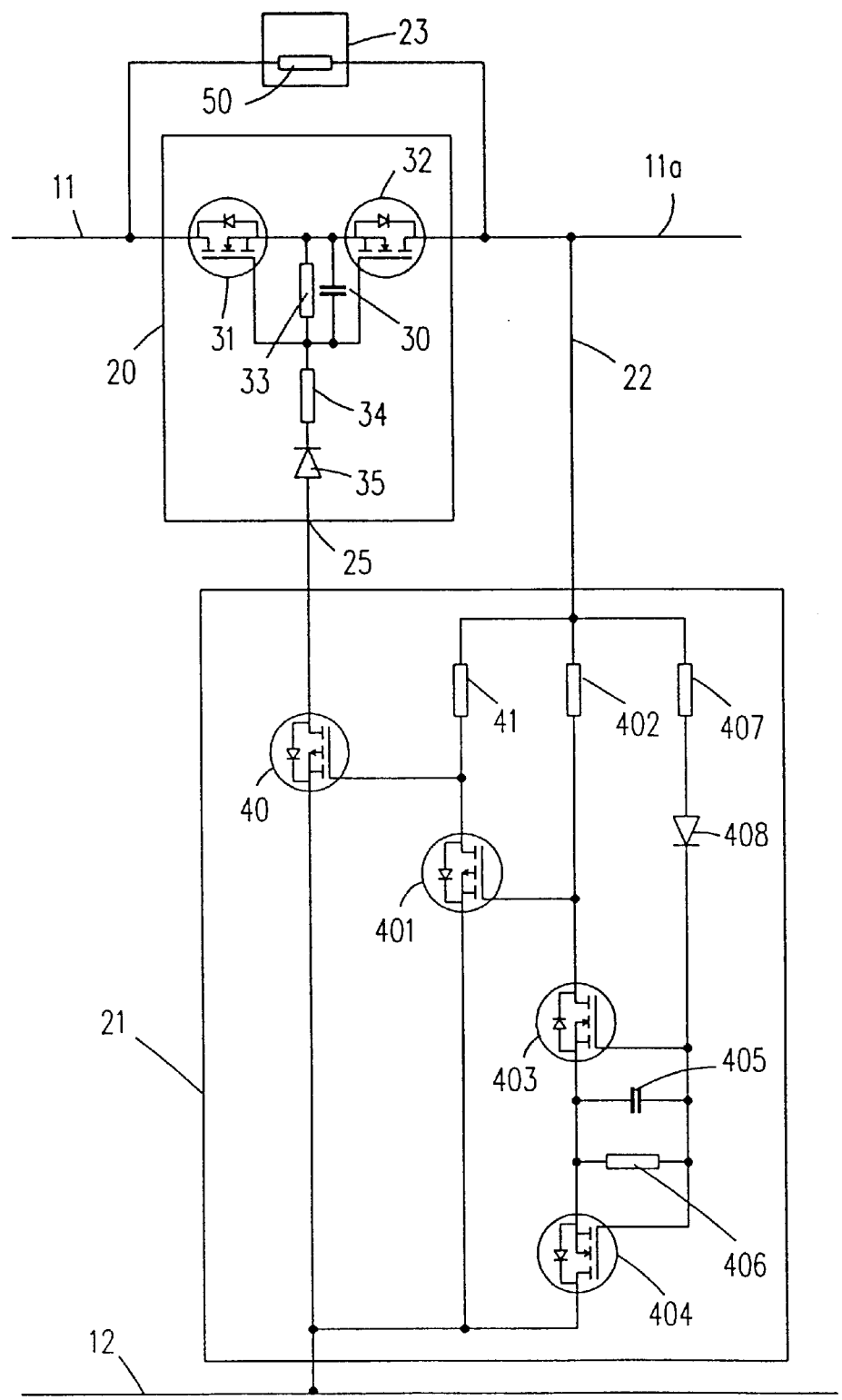
FIG. 8 is a circuit arrangement for AC voltage supply whereby short-circuits are detected during the positive and the negative half-wave.

FIG. 8 shows an embodiment for AC voltage operation where the potential of the conductor 11 is higher than the potential of the conductor 12 during the positive half-wave and where the potential of the conductor 11 is lower than the potential of the conductor 12 during the negative half-wave. The circuit shown in FIG. 7 underlies the embodiment of FIG. 8. The embodiment of FIG. 8 also utilizes n-type transistors 31 and 32 in the switch 20. The control transistor 40 of the monitoring unit 21 is a p-type transistor as in FIG. 7. The monitoring unit 21, without the elements 401 to 408, recognizes short-circuits only during the negative half-wave, because the control transistor 40 must be driven by means of a negative gate-source voltage so as to be turned on. In order to make the monitoring unit 21 also suitable for short-circuits acting during the positive half-wave only, the monitoring unit 21 is extended with components 401 to 408 which open the switch 20 also in the case of short-circuits during the positive half-wave, i.e. in the case of short-circuits via diodes whose anode is connected to the conductor 11 and whose cathode is connected to the conductor 12.

The switch 20 includes a capacitance 30 and a diode 35 in order to store the charge required for the turned on state of the power transistors 31 and 32 during the positive half-wave. The monitoring unit 21 is extended with a circuit consisting of the switches 401, 403 and 404, the resistors 402, 406 and 407, the capacitance 405 and the diode 408 so as to recognize the occurrence of a short-circuit via a diode during the positive half-wave and to control the switch 20 accordingly. In the turned on state of the power transistors 31 and 32 the capacitance 405 is charged to a positive voltage during the positive half-wave, via the current path resistor 407→diode 408→resistor 406→diode in the switch 404. The diode 408 prevents discharging during the negative half-wave. The capacitance 405 thus receives a voltage at which the switches 403 and 404 are closed. The discharging via the resistor 406 during the negative half-wave is proportioned in such a manner that the capacitor 405 can be discharged only slightly during one period, whereas the charging via the resistor 407 can take place for the duration of a positive half-wave. The continuously closed switches 403 and 404 keep the switch 401 always open, so that during normal operation the control transistor 40 operates in the same sense as in the circuit of FIG. 7 during the negative half-wave. Because the potential of the conductor 11 is higher than the potential of the conductor 12 during the positive half-wave, the p-type control transistor 40 receives a positive gate source voltage, so that it is not turned on. If the potential of the conductor 11 becomes lower than that of the conductor 12 during the negative half-wave, the p-type transistor 40 receives a negative gate source voltage so that it is turned on. In this state the capacitance 30 of the switch 20 can be charged via the current path: switch 40→diode 35→resistor 34→resistor 33→diode in the power switches 32 and 31. This produces a positive gate source voltage at the power transistors 31 and 32, so that both transistors are turned on and the switch 20 is closed. The discharging of the capacitance 30 via the resistor 33 is proportioned such that the voltage across the capacitance 30 changes only slightly during one period. The capacitance 30 is charged, via the resistor 34, for the duration of a negative half-wave.

Short-circuits which have the same effect during both half-waves are direct (low-ohmic) short-circuits and short-circuits via a resistor between the conductors 11 and 12, the value of the resistance being dependent on the proportioning of the disconnecting unit. When a direct short-circuit, or a short-circuit via a resistor between the conductors 11 and 12, occurs at the output of the disconnecting unit, the control transistor 40 (normally closed during the negative half-wave) remains open. The control transistor 40 is always open during the positive half-wave. As a result, the control input 25 is no longer connected to the potential of the conductor 12 at any time, and the capacitance 30 is discharged via the resistor 33. Thus, the positive gate source voltage cannot be formed at the power switches 31 and 32, so that the power transistors 31 and 32 are turned off. The source 10 (FIG. 1) is thus isolated from the short-circuit and the test state is established with the connection via the test resistor 23. The circuit section comprising the switches 403, 404 and 401 is irrelevant for this type of direct short-circuit. The situation for short-circuits which have an effect only during the negative half-wave, i.e. via diodes whose anode is connected to the conductor 12 which carries the higher potential during the negative half-wave and whose cathode is connected to the conductor segment 11a carrying the lower potential during the negative half-wave, is then the same as given above, because the control transistor 40 remains turned off during the negative half-wave, due to the short-circuit, and the control transistor 40 is always turned off during the positive half-wave. For short-circuits which have an effect only during the positive half-wave, i.e. via diodes whose anode is connected to the conductor 11 which carries the higher potential during the positive half-wave and whose cathode is connected to the conductor 12 carrying the lower potential during the positive half-wave, the capacitance 405 is not charged via the resistor 407 and the diode 408. The capacitance 405 is discharged via the resistor 406 and the switches 403 and 404 always remain open. During the positive half-wave, the control transistor 40 and the switch 401 always remain open or are turned off. Upon the transition to the negative half-wave the switch 401 is closed so that the control transistor 40 receives a gate source voltage below its switch-on threshold and hence also remains turned off during the negative half-wave. Thus, the control input 25 is no longer connected to the potential of the conductor 12 at any time and the capacitor 30 is discharged via the resistor 33. The power transistors 31 and 32 are turned off and the switch 20 is open. The source 10 (FIG. 1) is thus isolated from the short-circuit and the test state is established with the single connection via the test resistor 23. For the case where a short-circuit occurs during operation, the monitoring unit 21 recognizes short-circuits between the conductors 11a and 12 in the described manner and the power switches 31 and 32 of the switch 20 are quickly opened. When the short-circuit between the conductors 11a and 12 is removed again, the potential at the output of the switch 20 can again assume, via the test resistor 23 and hence on the test conductor 22 of the monitoring unit 21, a value at which the control transistor 40 is turned on and hence the normal operation is automatically restored.

Because of the arrangement of the switch 20 in the conductor 11, carrying a potential which is lower than that of the conductor 12 only during the negative half-wave, the control transistor 40 of the monitoring unit 21 recognizes all short-circuits occurring during the negative half-wave.

Using the additional circuitry, consisting of the switches 404, 403 and 401 in the monitoring unit 21, the short-circuits occurring in the positive half-wave are additionally recognized.

If, as opposed to the representation of FIG. 8, the switch 20, consisting of n-type transistors, is arranged in the conductor 12 which carries the lower potential only during the positive half-wave, and the monitoring unit 21 establishes the connection to the conductor 11 via the p-type control transistor 40, the control transistor 40 of the monitoring unit 21 recognizes all short-circuits occurring during the positive half-wave. Using the additional circuitry, consisting of the switches 404, 403 and 401 in the monitoring unit 21, the short-circuits which may occur during the negative half-wave are also recognized.

It is also possible to implement an embodiment for AC voltages which is based on the principle of the circuit arrangement of FIG. 6. The switch 20 includes p-type transistors in the conductor 11 and the control transistor 40 is an n-type transistor. When the switch 20 is arranged in the conductor 11, carrying the higher potential only during the positive half-wave, the control transistor 40 of the monitoring unit 21, establishing the connection to the conductor 12, recognizes all short-circuits occurring during the positive half-wave. Using the additional circuitry, consisting of the switches 404, 403 and 401 in the monitoring unit 21, the short-circuits which may occur during the negative half-wave are also detected. The switches 31, 32, 404 and 403 are then constructed as p-type transistors and the switches 40 and 401 as n-type transistors.

When the switch 20, comprising two p-type transistors, is inserted in the conductor 12 which carries the higher potential only during the negative half-wave, the control transistor 40 of the monitoring unit 21, establishing the connection to the conductor 11, recognizes all short-circuits occurring during the negative half-wave. Using the additional circuitry, consisting of the switches 404, 403 and 401 in the monitoring unit 21, the short-circuits which may occur during the positive half-wave are also detected. The switches 31, 32, 404 and 403 are then constructed as p-type transistors and the switches 40 and 401 as n-type transistors.

The latter embodiments offer perfect recognition of all three types of short-circuits described; in the case of a short-circuit via a resistor, the resistance value which is still detected as a short-circuit will be dependent on the value of the test resistor 50 and the current flow during normal operation.

A further possibility for recognizing short-circuits in the case of an AC voltage and for controlling a power switch consists in providing a respective disconnecting unit for the negative half-wave and for the positive half-wave. For the positive half-wave, during which the potential of the conductor 11 is higher than the potential of the conductor 12, a switch 20 as shown in FIG. 6 is inserted in the conductor 11 or a switch as shown in FIG. 7 is inserted in the conductor 12. For the negative half-wave, during which the potential of the conductor 11 is lower than the potential of the conductor 12, a switch 20 as shown in FIG. 6 is inserted in the conductor 12 or a switch as shown in FIG. 7 is inserted in the conductor 11. Both disconnecting units must be connected functionally one behind the other, so that the data or energy from the source 10 is propagated only when both disconnecting units have not detected a short-circuit. As opposed to the arrangement of FIG. 8, this arrangement requires a larger number of power switches.

Figure 9:
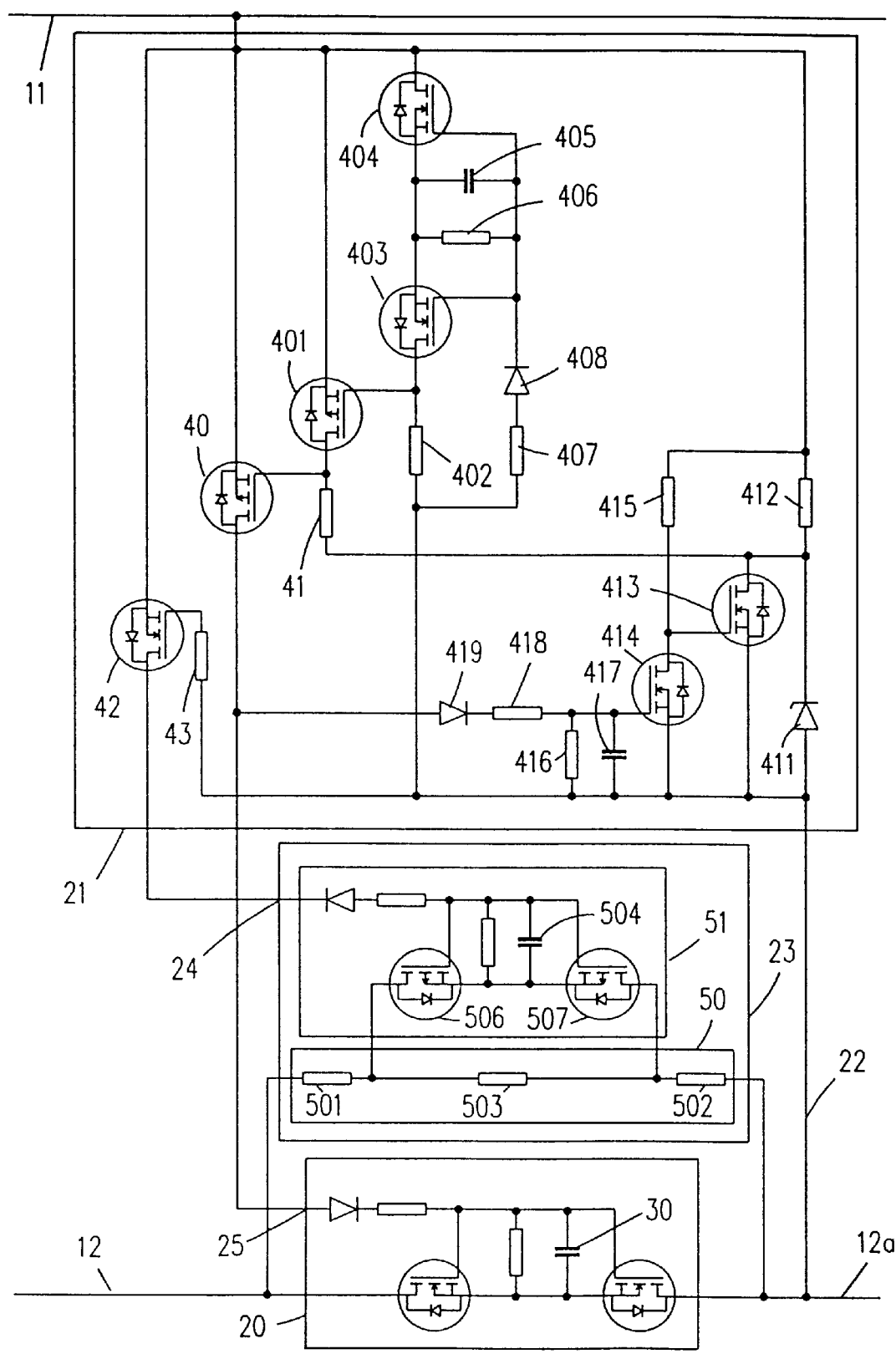
FIG. 9 is a circuit arrangement as shown in FIG. 8 in which the switch is arranged in the other conductor, supplemented by elements for achieving hysteresis for the actuation threshold and for step-wise control of the test resistor.

FIG. 9 shows an embodiment in which the switch 20 is inserted in the conductor 12 in conformity with the circuit of FIG. 7. The monitoring unit 21 recognizes, by way of the control transistor 40, all short-circuits which occur during the positive half-wave and, by way of the switches 401, 403 and 404, the additional short-circuits which occur during the negative half-wave. In order to enhance the reliability of recognition of short-circuits during the positive half-wave, hysteresis is provided in respect of the actuation threshold of the control transistor 40. During normal operation of the disconnecting unit, while the switch 20 is closed, a high actuation threshold exists so as to enable fast opening of the switch 20 in response to the decreasing of the voltage at the output of the disconnecting unit which is sensed with the test conductor 22, via the resistor 41, during the positive half-wave, said opening preventing overloading of the source 10 (FIG. 1). However, in the open state of the switch 20 there is a low actuation threshold in order to enable, via the high-ohmic test resistor 23, reliable testing for short-circuits during the positive half-wave and the normal load of other stations in the system cannot imitate a short-circuit. Such hysteresis is achieved by means of the switches 413 and 414 and the zener diode 411. If the control transistor 40 is turned on during the positive half-wave, the switch 20 is also closed. This information is used to keep the switch 414 closed in that the capacitance 417 is charged, via the control transistor 40, the diode 419 and the resistor 418, during the positive half-wave. This charging condition is sustained during the negative half-wave, since the discharging via the resistor 14 is adjusted to be so small that the charging condition hardly changes. The closed switch 414 keeps the switch 413 open, so that the zener diode 411 determines the actuation threshold for the switching of the control transistor 40. The setting of the actuation threshold must ensure that during the positive half-wave the control transistor 40 is closed for such a period of time that the capacitances 30 and 417 in the switch 20 and in the hysteresis definition circuit of the monitoring circuit 21 can be adequately charged. If the control transistor 40 is turned off during the positive half-wave, the switch 20 is also open and a connection between the input and the output of the switch 20 exists only via the test resistor 23. This information is used to adjust the actuation threshold for the control transistor 40 to a low voltage value during the positive half-wave in that the capacitance 417 is discharged via the resistor 416 and the switch 414 is opened. As a result, the switch 413 is closed during the positive half-wave so that the zener diode 411 is bridged.

In order to improve the interruption properties of the switch 20 during the transmission of energy and/or data, the test resistor 23 may not become low-ohmic. This requirement opposes the requirement that a minimum voltage level must be present at the output of the switch in order to ensure reliable recognition of the normal case, i.e. absence of a short-circuit. In the case of large loads, i.e. a low load resistance behind the switch, the test resistor must be chosen to be low-ohmic accordingly. In systems with a low-ohmic load during the positive half-wave and a high-ohmic load during the negative half-wave, it is possible to adjust the value of the test resistor 23 in steps in conformity with the situation. To this end, during the negative half-wave the state of the conductor 12a at the output of the switch 42 is sensed by means of the switch 42 of the monitoring circuit 21, via the resistor 43 and the test conductor 22. If the negative half-wave can develop in the usual manner, the switch 42 is closed and the bridging capacitance 504 in the control unit 51 of the test resistor 23 is charged via the control input 24. The charging condition is sustained during the positive half-wave so that the switch consisting of the transistors 506 and 507 in the control unit 51 is continuously closed and the sub-resistor 503 of the resistance unit 50 is bridged. The low-ohmic component of the test resistor 23, consisting of the sub-resistors 501 and 502, then acts between the input and the output of the disconnecting unit. If the negative half-wave cannot be built up, i.e. a short-circuit exists between the conductors 11 and 12a, the switch 42 is not closed and hence the switch with the transistors 506 and 507 in the control unit 51 of the test resistor 23 cannot be closed, so that the sub-resistor 503 is not bridged. The sum of the sub-resistors 501, 502 and 503 of the test resistor 23 then acts between the input and the output of the switch 20.

This arrangement achieves two-step switching on of the disconnecting unit, i.e. first the high-ohmic test resistor 23 checks for short-circuits during the negative half-wave. Direct short-circuits, short-circuits via a low-ohmic resistor and short-circuits via a diode whose anode is connected to the conductor 12 and whose cathode is connected to the conductor 11 are thus recognized. It is only in the absence of such short-circuits that switching over to a low-ohmic test resistor takes place, enabling the recognition of a short-circuit via a diode whose anode is connected to the conductor 11 and whose cathode is connected to the conductor 12 during the positive half-wave. When the switch 20 is open, a high-ohmic connection exists between the input and the output of the switch 20 during the positive half-wave, via the test resistor 23, i.e. suitable decoupling of the parts of the system that are still operational from parts of the system which are affected by the short-circuit is achieved. The sum of the sub-resistors 501, 502 and 503 of the test resistor 23 is chosen to be such that a sufficiently high signal appears at the output of the switch 20 for the high-ohmic negative half-wave, so that a reliable distinction can be made between normal operation and a short-circuit occurring. Similarly, the sum of the sub-resistors 501 and 502 must be proportioned so that a reliable distinction can be made between normal operation and a short-circuit during the positive half-wave.

The above embodiments utilize n-type and p-type transistors in the monitoring units 21 and 28 for the recognition of a short-circuit and for the switching of the control input of the switch 20. The use of such transistors is merely an example of implementation, enabling simple and reliable recognition of a short-circuit. Other possibilities are offered by the use of, for example voltage comparators and similar components. The switches can also be constructed while utilizing bipolar transistors.

What is claimed is:

1. Apparatus for transmitting data and/or energy over a pair of conductors between a generator and a plurality of user stations in a communication system; said apparatus comprising a disconnect unit which includes a switch and a monitoring unit;

said switch being connected to a first of said conductors so as to divide it into a first and a second conductor segment which are serially connected or disconnected via said switch depending on whether said switch is conductive or non-conductive, said switch being adapted when conductive to conduct current in either direction between said first and second segments of the first of said conductors;

said disconnect unit further including a current limiting circuit element bridging said switch so as to provide a high ohmic level coupling path between said first and second conductor segments when said switch is non-conductive;

said monitoring unit being connected to at least one of said conductor segments and being adapted to control said switch to become non-conductive when the potential of said one conductor segment falls below a first activation threshold and to become conductive again when the potential of said one conductor segment rises above a second activation threshold; and said monitoring unit comprises an FET connected in series between a second of said conductors and a control input of said switch, the gate of said FET being connected to one of said first and second segments of the first of said conductors.

2. Apparatus as claimed in claim 1, wherein said second activation threshold exceeds said first activation threshold.

3. Apparatus as claimed in claim 1, wherein said switch includes as least one FET which is coupled to said monitoring unit.

4. Apparatus as claimed in claim 1, wherein said first and second conductors are supplied by said generator with an AC voltage and said switch includes two FET's of the same type connected in series between the first and second segments of said first conductor, the gates of said two FET's being interconnected and coupled to said monitoring unit.

5. Apparatus as claimed in claim 4, wherein the two FET's in said switch are interconnected at a common junction point, and the gates thereof are together connected to said junction point by a capacitor in parallel with a charge discharge path, said gates also both being connected by a diode to the FET in said monitoring unit.

6. Apparatus as claimed in claim 5, wherein during alternate half cycles of the AC voltage said capacitor charges to a potential which renders the two FET's in said switch conductive during the succeeding half cycles of the AC voltage.

7. Apparatus as claimed in claim 5, wherein the two FET's in said switch are of opposite conductivity type to that of the FET in said monitoring unit.

8. Apparatus as claimed in claim 5, wherein the monitoring unit turns off the FET therein in the event of an overload during half cycles of the AC voltage which are not monitored relative to said activation thresholds.

* * * * *